United States Patent [19]

Kirtland

[11] Patent Number: 5,209,338

[45] Date of Patent: May 11, 1993

[54] PRODUCT CONTROL APPARATUS

[75] Inventor: Dennis A. Kirtland, Ashby-de-la-Zouch, England

[73] Assignee: W. H. Dunn & Son Ltd., Leicestershire, England

[21] Appl. No.: 762,023

[22] PCT Filed: Mar. 15, 1990

[86] PCT No.: PCT/GB90/00393

§ 371 Date: Sep. 16, 1991

§ 102(e) Date: Sep. 16, 1991

[87] PCT Pub. No.: WO90/11239

PCT Pub. Date: Oct. 4, 1990

[30] Foreign Application Priority Data

Mar. 17, 1989 [GB] United Kingdom ............... 8906149
Jun. 6, 1989 [GB] United Kingdom ............... 8913003

[51] Int. Cl.⁵ .................................. B65G 37/00
[52] U.S. Cl. ......................... 198/365; 198/440
[58] Field of Search .............. 198/365, 440, 412

[56] References Cited

U.S. PATENT DOCUMENTS

| | | | |
|---|---|---|---|
| 3,580,379 | 5/1971 | Shuster | 198/401 |
| 3,677,389 | 7/1972 | Benatar et al. | 198/411 X |
| 3,735,867 | 5/1973 | Vanderhoof et al. | 198/365 X |
| 3,791,518 | 2/1974 | Vanderhoof | 198/440 X |
| 4,283,245 | 8/1981 | Benoit | 198/440 X |
| 4,508,206 | 4/1985 | Moore et al. | 198/365 |
| 4,577,745 | 3/1986 | Calvert et al. | 198/440 X |

FOREIGN PATENT DOCUMENTS 1292378 10/1972 United Kingdom .

Primary Examiner—Robert P. Olszewski
Assistant Examiner—Cheryl L. Gastineau
Attorney, Agent, or Firm—W. Thad Adams, III

[57] ABSTRACT

A high speed production line system has a product conveying section wherein a conveyor is formed from a plurality of individual and transversely extending pallets which are movable relative to one another in the transverse direction. Certain of the pallets have a cam controlled movement whereby upstanding posts can engage with packs of products to turn the packs through 90° while the packs pass through the conveying section. Thereafter, the packs can be moved into different lanes as required by virtue of cam control of the pallets.

14 Claims, 3 Drawing Sheets

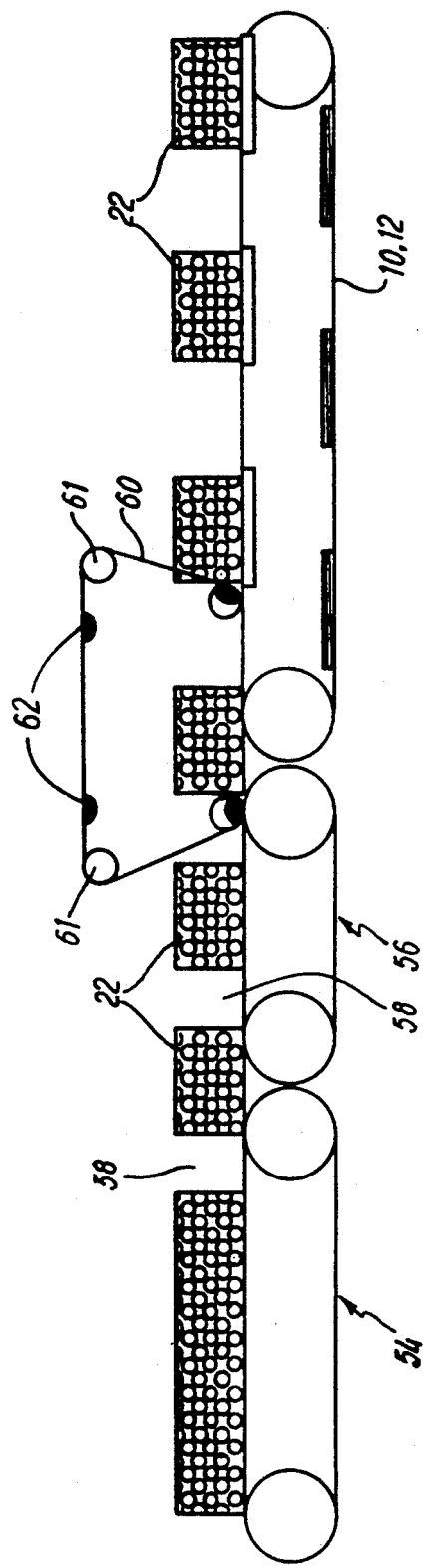

PRODUCT CONTROL APPARATUS

This application is a PCT application. This application claims the priority dates of Mar. 17, 1989 and Jun. 6, 1989 for Great Britain Patent Nos. 8906149.3 and 8913003.3, respectively.

This invention relates to product control apparatus and is particularly concerned with conveying of products in a production line system.

In a high speed production line system, it can be necessary at certain conveying sections to change the orientation of the products being conveyed, and this can often result in having to slow down or even stop the production line. Also it can be necessary to divert respective products into different paths of movement. Such operations have heretofore been carried out by separate systems, inevitably resulting in a relatively large overall machine which is disadvantageous, as optimum use of floor space is highly desirable.

According to the present invention there is provided product control apparatus comprising means for conveying products along a path and means for changing the orientation of the products during conveying movement along the path, the conveying means including a multiplicity of support members extending transversely of the conveying path, at least selected ones of the support members being movable transversely of the conveying path, characterised in that the support members are adapted directly to receive the products, and each of said selected ones of the support members includes means arranged for engagement with the products to change the orientation of the latter relative to the support members.

The product engagement means of each of said selected support members may comprise a projection which is upwardly extending in use.

Each of said selected ones of the support members preferably has cam means engagable in a profiled track to control the transverse movement, and the cam means may extend downwardly of the support members in use.

Preferably the apparatus includes means for automatically changing the position of the products during conveying movement along the path.

Each of the other ones of the support members preferably has cam means engageable in a further profiled track to also be movable transversely of the conveying path. The further profiled track is preferably adapted to divert respective groups of said other ones of the support members into different paths of movement, whereby the products supported by said respective groups can be subsequently moved along said different paths.

Further, means may be provided for feeding products onto the conveying path in synchronism with the positioning of said selected ones of the support members. The product feeding means may comprise a pair of parallel, transversely spaced endless chains with drive means therefor, and a plurality of flight bars extending between the chains at spaced locations, whereby the flight bars are movable into the conveying path to move products through the feed unit.

Preferably an electronic control system is provided for driving the chains of the product feed unit and the product conveying means in a synchronised relation.

An embodiment of the present invention will now be described by way of example only with reference to the accompanying drawings, in which:

FIG. 4 is a schematic side elevation of part of the apparatus.

Figure 1:
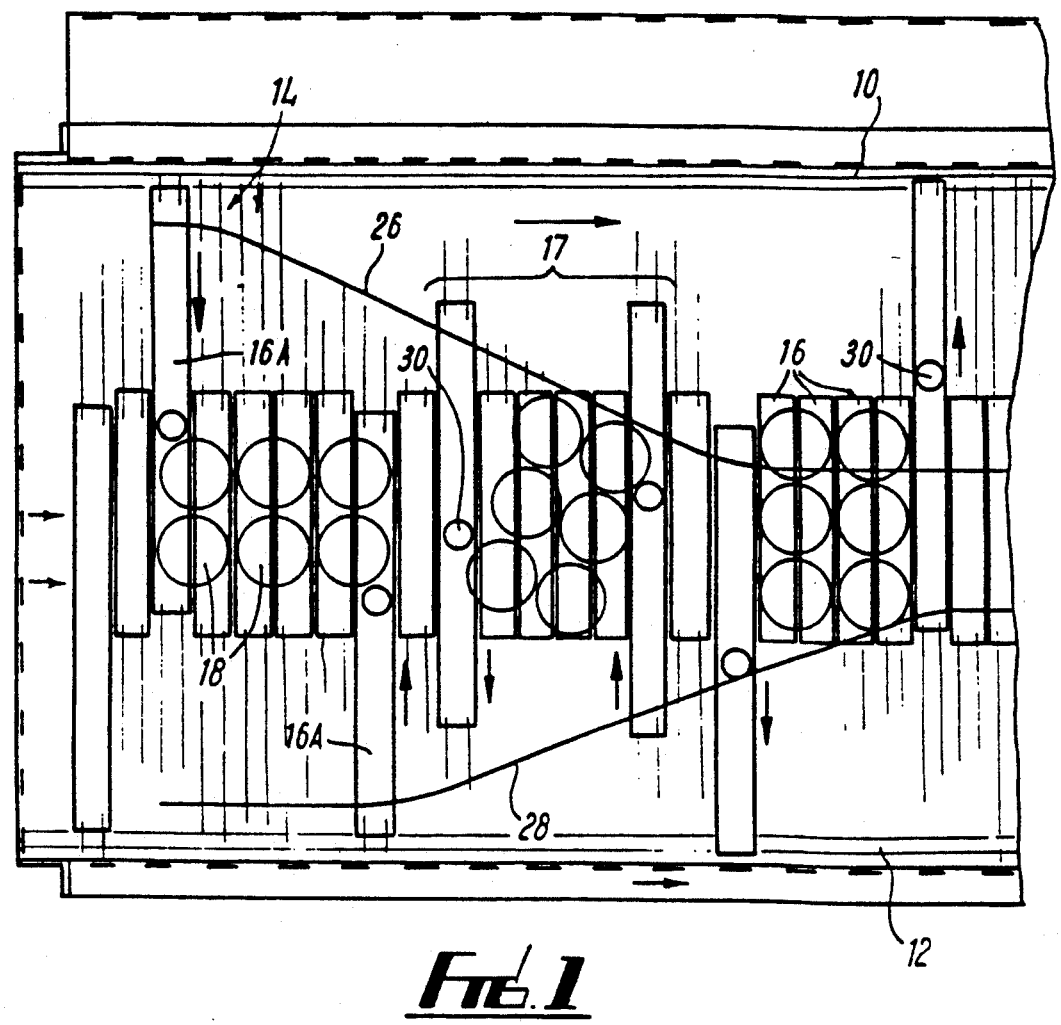
FIG. 1 is a schematic plan view of part of product control apparatus according to the invention.
Figure 2:
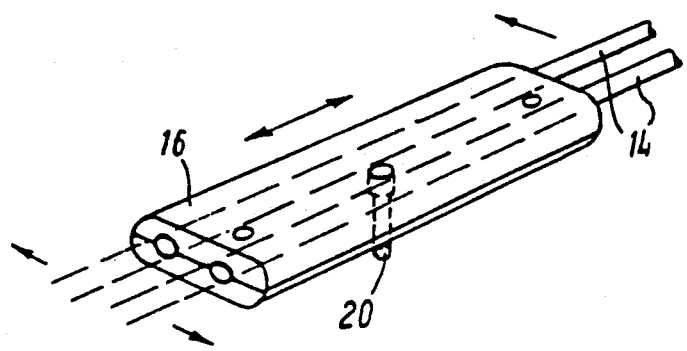
FIG. 2 is a schematic perspective view in detail of part of the apparatus of FIG. 1.

Referring to FIGS. 1 and 2 of the drawings, a high speed production line system includes a product conveying section having a pair of parallel, transversely spaced outboard precision roller chains 10, 12 driven by suitable drive sprockets. Extending between the chains 10, 12 and fitted to each chain roller pitch are a pair of parallel, spaced crossbars 14. On the crossbars 14 associated with each chain roller pitch is mounted a pallet 16 or 16A formed of two halves fitted together respectively from above and below the bars 14 whereby the latter extend through the respective formed pallet. The latter is slidable on the bars 14 and is of reduced length relative to the bars 14. In each grouping 17 of six pallets, the first and sixth pallets 16A as shown in FIG. 1, are longer than the others for a purpose hereinafter described. A further pallet 16 spaces adjacent groupings 17. The pallets 16, 16A are preferably formed of a plastics material but any other suitable material could be utilised. It will be appreciated that the pallets in use collectively form a continuous mat to act as a support for products 18 being conveyed thereon.

To provide for control of movement of the pallets 16 relative to the conveying path, each of the pallets 16 has a cam follower in the form of a downwardly extending peg 20 located substantially centrally of the length of the pallet 16. The peg 20 engages within a cam track (not shown) which is within the conveying section over the length of the conveying path and constrains the pallets 16 to move in a straight line centrally between the chains 10, 12.

The conveying section is specifically designed for changing the orientation of a pack 22 of six products 18. Each pack 22 can be delivered onto the conveying pallets 16 with the products 18 in two parallel rows of three, the rows being parallel to the chains 10, 12. The conveying section is designed to move each pack 22 through 90° as shown.

For this purpose each of the pallets 16A has a cam follower in the form of a downwardly extending peg (not shown) positioned towards a respective end of the pallet 16A. Alternate ones of the pallets 16A have their pegs located towards the ends nearest the chain 12, whereas the others of the pallets 16A have their pegs located towards the ends nearest the chain 10. A pair of cam tracks 26, 28 are provided within the conveying section on respective sides of the longitudinal centre line thereof whereby transverse or crossover movement of the pallets 16A is controlled as hereinafter described.

Each of the pallets 16A further has an upstanding post 30 of circular configuration which is offset centrally along the length of the respective pallets 16A to the side remote from the peg. As an alternative the post 30 may be replaced by a roller on a vertical axis.

When a pack 22 of products 18 is delivered onto a grouping 17 of the conveying section, the products 18 overlie the pallets 16A in the grouping 17 and the pallets 16 therebetween. The cam tracks 26, 28 each have such a profile initially that the pallets 16A are at their outermost positions on respective sides with the respective posts 30 closely adjacent respective sides of the pack 22. As the pack 22 is moved along the conveying path the profile of the cam tracks 26,28 is such as to move the respective pallets 16A inwardly from either side, whereby the posts 30 engage against adjacent end ones of the products 18 in the pack 22 and consequently begin to rotate the latter. During continued movement along the conveying path, the pallets 16A cross-over gradually to their other outermost positions, with the posts 30 having moved the products 18 through 90° until the products 18 overlie only the pallets 16 in the grouping 17.

The apparatus enables a turning action to re-position products being conveyed through 90° over a distance of less than one meter travel, and the turning can be carried out within a production line system at high speeds both positively and accurately.

Figure 3:
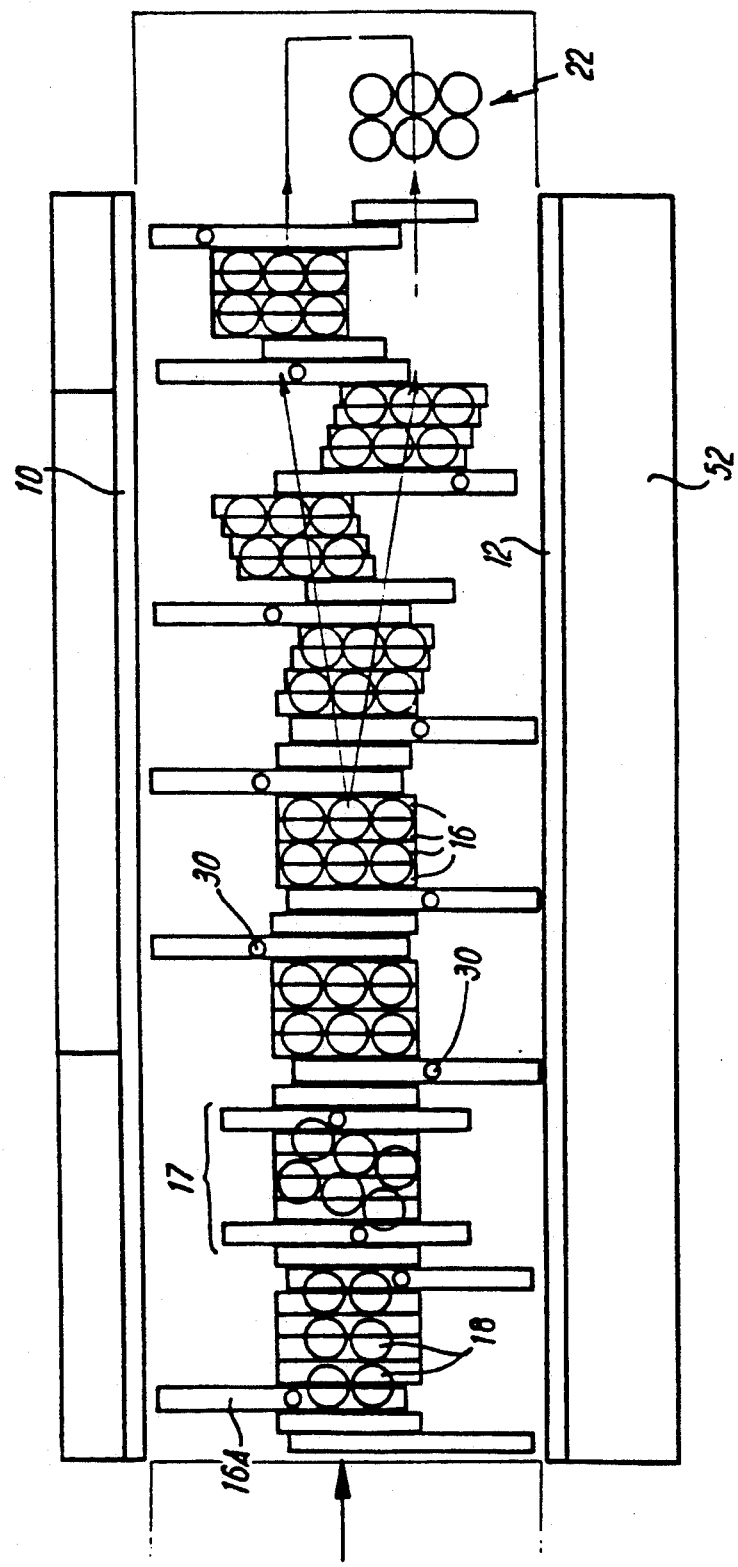
FIG. 3 is a schematic plan view showing further details of the apparatus.

At the end of the product turning section the pallets 16,16A continue through a further conveying section 52 (FIG. 3). Throughout the section 52 the cam tracks for the pegs of the pallets 16A retain the latter in their outermost positions.

Also at the end of the product turning section, the cam track for the pegs of the pallets 16 is associated with set fork guides to divide into two guide tracks, or alternatively a switch block is provided, whereby alternate groups of the pallets 16 supporting a respective pack 22 of the products are moved into one of the guide tracks, while the other groups of the pallets 16 are moved into the other of the guide tracks. In this way the same pallets 16 as supported the packs 22 through the turning section, support the packs 22 also through the conveying section 52 and simultaneously separate the packs 22 into different paths of movement for subsequent use as necessary. The packs may be divided, for example according to colour, size, etc, and can be subsequently moved via transfer rollers (not shown) onto an outgoing conveyor.

When reaching the end of the conveying section 52, return cam tracks are provided to guide both the pallets 16 and 16A in a lower path, by means of their pegs, back to their original positions, to enable the turning and dividing operations to re-commence once the pallets 16,16A return to the upper part of the conveying section at the product feed unit.

The delivery of packs 22 to the turning section has to be synchronised with the positioning of the pallets 16A.

The delivery of the packs 22 is by way of a metering conveyor 54 (FIG. 4) from where the packs 22 are transferred to an acceleration conveyor 56. The latter functions to create gaps 58 between adjacent ones of the packs 22 and moves the latter to an entry end of a feed unit (not shown). The latter comprises a housing having opposed side walls and a pair of parallel transversely spaced endless chains each inwardly adjacent a respective side wall. Each chain passes around respective ones of pairs of sprockets 61, only one chain 60 being shown schematically. Drive is imparted to one of the pairs of sprockets 61 from a drive external of the feed unit. Extending between the chains 60 at spaced locations along the length thereof are a plurality of flight bars 62. The packs 22 pass between the respective side walls of the feed unit from the acceleration conveyor 56 onto the cross bars 16, 16A, the conveyors 54, 56 being so synchronised with the chains 60 that each of the flight bars 62, on its movement into the path of the packs 22, locates between respective spaced ones of the packs 22 and then engages with the forward pack on the acceleration conveyor 56 to push the forward pack onto the pallets 16, 16A of the turning section. The chains 60 are synchronised with the turning section to accurately place the packs 22 into position thereon.

Control of the apparatus is effected by way of an electronic control system which ensures sychronised operation of the product feed unit with the turning section. Also to minimise intermittent operation, the control system can automatically adjust the speed of delivery of products to the feed unit on demand. The control system further includes a mimic display indicative of the status of the apparatus.

The apparatus is preferably designed so that the turning operation can be rendered ineffective if required, for example where the packs do not require turning.

The apparatus is designed so that changes in operation are easily carried out, for example to eliminate turning of packs in the turning section and to handle, for example, four bottle packs as an alternative to six bottle packs. The apparatus can also be adjusted to separate into more than two lanes if required. It is further possible to adjust the outfeed centres of the paths or lanes into which the packs are separated, for example by way of a doubled threaded bar controlled by an externally accessible hand wheel.

In another possible arrangement, for example where marking of products is required, the packs may be turned through 90° as hereinbefore described for marking of the packs, before, on the same apparatus, being automatically turned back through 90° after marking. It will be appreciated that the cam tracks may be modified to enable this two-stage turning, while otherwise the apparatus is as hereinbefore described. After the two-stage turning, the packs can be moved into a multi-lane arrangement, again as previously described.

Various modifications may be made without departing from the invention. For example the relative positions of the pallets 16,16A may differ from that described and shown to accommodate different arrangements of products being conveyed. Also the construction of the pallets may differ from that described and shown, and the design of the product feed unit may also differ from that described and shown, provided the required synchronism can be achieved.

It is preferred to have the pallets 16A in a plane slightly lower than the plane of the pallets 16 so that no drag is created when the packs 22 are dividing and passing over the pallets 16A towards the end of the conveying section 52.

The integration of the turning and dividing operations in a single apparatus provides the advantages of full utilization of components and considerable reduction in overall length of the apparatus, for example one meter.

Various other modifications may be made without departing from the invention. For example, the grouping of pallets may be a grouping of five pallets with the first and fifth pallets being provided with posts and therefore corresponding to the pallets 16A. Between each grouping there may be provided four further pallets, thereby increasing the spacing between adjacent packs. Further, the pallets 16A may be of substantially the same length as the pallets 16 with appropriate modification of the cam tracks, in which case each post 30 would be positioned adjacent one end of the respective pallet 16A. Also upstanding members other than circular posts or rollers may be utilised. The construction of the pallets may differ from that described and shown.

The apparatus is also adapted to be used in sychronism with different types of known equipment upstream of the turning section 50, such as a can or bottle orientor, a hi-cone jacket pack, cluster pack or other packaging or handling unit. The apparatus is therefore very versatile as well as making optimum use of the components thereof.

I claim:

1. Product control apparatus comprising conveying means for conveying product along a first path, the conveying means including support means adapted directly to receive the products, such that the products can be moved relative thereto, and product engaging means arranged for engagement directly with the products during conveying movement along the first path, the product engaging means being carried by the apparatus in moving relation when engaging with products being conveyed and to thereby provide for changing the orientation of each of the products relative to the support means while continuing conveyance of the products along the first path.

2. Apparatus according to claim 1, wherein product feed means are provided for feeding product on to the conveying path in synchronism with the positioning of the product engagement means.

3. Apparatus according to claim 2, wherein an electronic control system is provided for driving the product feed means and the product conveying means in a synchronized relation.

4. Apparatus according to claim 3, wherein the control system is adapted to automatically adjust the speed of the product conveying means on demand.

5. Apparatus according to any one of claims 2 to 4, wherein the product feeding means comprises a pair of parallel, transversely spaced endless chains with drive means therefor, and a plurality of flight bars extending between the chains at spaced locations, whereby the flight bars are movable into the conveying path to move products through the product feeding means.

6. Apparatus according to claim 1, wherein the support means comprises a multiplicity of support members extending transversely of the conveying path.

7. Apparatus according to claim 6, wherein further support members are moveable transversely of the conveying path.

8. Apparatus according to claim 7, wherein the product engagement means is provided on each of said further support members and comprises a projection which is upwardly extending in use.

9. Apparatus according to claim 1 or 8, wherein each of said further support members has cam means engagable in a profiled track to control the transverse movement.

10. Apparatus according to claim 9, wherein the cam means extends downwardly of the support members in use.

11. Apparatus according to claim 1, including position changing means for automatically changing the position of the products during conveying movement along a further path.

12. Apparatus according to claim 6, wherein each of the support members of the support means has cam means engagable in a further profiled track to be movable transversely of a further conveying path.

13. Apparatus according to claim 12, wherein the further profiled track is adapted to divert respective groups of the support members of the support means into different paths of movement, whereby the products supported by said respective groups can be subsequently moved along said different paths.

14. Product control apparatus comprising conveying means for conveying products along a path and orientation means for changing the orientation of the products during conveying movement along the path, the conveying means including a multiplicity of support members extending transversely of the conveying path, at least selected ones of the support members being movable transversely of the conveying path, wherein the support members are adapted directly to receive the products, and each of said selected ones of the support members includes product engaging means arranged for engagement with the products to change the orientation of the product relative to the support members.

* * * * *